United States Patent Office 2,835,681
Patented May 20, 1958

2,835,681

METHOD OF PREPARING α-ESTRADIOL

André Allais, Paris, and Charles Hoffmann, Noisy le Grand, France, assignors to Les Laboratoires Francais de Chimiotherapie, Paris, France, a French body corporate No Drawing. Application February 26, 1957
Serial No. 642,334

Claims priority, application France February 28, 1956

7 Claims. (Cl. 260—397.5)

This invention relates to a new method of preparing α-estradiol.

Depending upon the spatial location of the hydroxyl at the 17-position, estradiol occurs in the form of two isomers: as β-estradiol, M. P.=178° C., $[\alpha]_D^{20}=+77$ to $+79°$ (c.=1%, dioxane), which can be easily produced by conventional methods of reducing estrone or cracking 17β-hydroxy $\Delta^{1,4}$-androstadiene 3-one. This β-estradiol has strong estrogen power and is sold in form of various derivatives; or the compound occurs as α-estradiol, M. P.=225° C., $[\alpha]_D^{20}=+52.9°\pm1$ (c.=0.9%, dioxane), which has practically no estrogen power but is very difficult to obtain from the reduction products of estrone which, generally, comprise only small amounts thereof. This isomer is used in human and veterinary medicine as "inhibitor" of the anterior lobe of the pituitary gland (adenohypophysis).

We have now discovered that α-estradiol can be prepared by inversion of the hydroxy at the 17-position of β-estradiol after tosylation. More specifically, we found that 17-tosylated compounds of β-estradiol or derivatives thereof of the general Formula I (1)

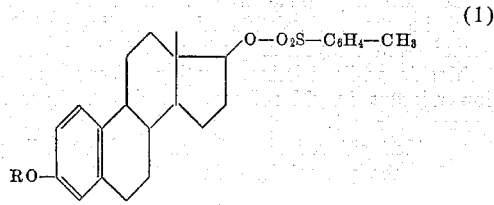

wherein R represents H, or an acyl or tosyl group, if subjected to an alkali acetate treatment in the presence of dimethylforamide, undergo an acetolysis with inversion of the hydroxyl at the 17-position. Depending upon the duration of the reaction and the applied temperature, this reaction is more or less quantitative and produces, after saponification of the 17-acetylated derivative, pure α-estradiol and variable amounts of a non-detosylated product which can be easily separated.

It is, therefore, the principal object of the present invention to prepare α-estradiol by inverting the hydroxyl at the 17-position of β-estradiol or β-estradiol derivatives. This and other objects and advantages of the invention will become more obvious from the herein following detailed description and from the appended claims.

Ordinarily, in order to produce the derivatives of Formula I, β-estradiol is tosylated so as to produce the 3,17-ditosylated derivative; or one of the 3-monoesters of β-estradiol, for example, commercial 3-benzoyl β-estradiol is monotosylated at the 17-position. It is equally possible to use as starting material 17-tosyl β-estradiol which may be obtained by selective saponification of 3-acetyl 17-tosyl β-estradiol, but it is obvious that this latter method is no improvement over the basic process according to the invention.

In order to practice the present invention, tosyl chloride is caused to react, in the presence of a tertiary base such as pyridine or methylethyl pyridine, with β-estradiol or with one of its 3-acylated derivatives, such as 3-benzoyl β-estradiol to produce the 3,17-ditosylated derivative or the 3-acylated 17-tosylated derivative, respectively, which is isolated and subjected to acetolysis by the action of an alkali acetate in the presence of dimethylformamide; the 17-acetoxy product is isolated and saponified without prior purification. Acidification of the saponified product produces α-estradiol without further steps.

The melting points mentioned in the herein following examples are instantaneous melting points obtained by means of the heated block method.

EXAMPLE 1

*Preparation of 3-benzoyl 17-tosyl β-estradiol*

$(R=C_6H_5—CO)$ 20 g. of 3-benzoyl β-estradiol are dissolved in 55 cc. of anhydrous pyridine. 20 g. of p-toluene sulfochloride are added in a single application, while stirring. Dissolution is accompanied by heating. Crystallization starts after 15 minutes. The solution is heated in a water bath for 30 minutes to 45–55° C. The solid mass that forms is allowed to cool to room temperature and is dissolved in 100 cc. of lukewarm chloroform. The chloroform solution is washed with water, then with hydrochloric acid in order to remove the pyridine, and again with water until neutral. After drying over sodium sulfate, the chloroform is evaporated until the residue crystallizes. The residue is triturated with alcohol, separated and washed with ether. After drying, 26.3 g. of 3-benzoyl 17-tosyl β-estradiol, M. P.=181° C. (or a yield of 93%) are obtained. The product is sufficiently pure to be subjected to acetolysis. Recrystallization in acetone raises the melting point to 184° C.

EXAMPLE 2

*Acetolysis of 3-benzoyl 17-tosyl β-estradiol*

20 g. of the product of Example 1, having a melting point of 181° C., are refluxed for six hours with 16 g. of fused potassium acetate, 150 cc. of dimethylethyl formamide and 15 cc. of water. After cooling, the reaction mixture is poured into one liter of water. The gummy product that precipitates is taken up with 250 cc. of chloroform, and the chloroform solution is first washed with 0.5 N hydrochloric acid and then with water until neutral, dried over sodium sulfate and filtered. Upon evaporation of the chloroform, a yellow-orange, fluid oil is obtained, composed of the 17α-acetoxy product and unconverted 17-tosyl β-estradiol.

EXAMPLE 3

*Preparation of 17-α-estradiol by saponification of the 17-acetoxy product*

The oily product obtained according to Example 2 is dissolved in 200 cc. of 95% alcohol. A solution of 12 g. of potassium in 10 cc. of water and 100 cc. of methanol is added, and the mixture is boiled under reflux for two hours while introducing a stream of nitrogen. The solution is concentrated to almost dryness under reduced nitrogen pressure, allowed to cool down, and taken up with 500 cc. of water. After acidification with hydrochloric acid, using Congo red paper as an indicator, the solution is cooled and iced. A half gummy, half crystalline precipitate is separated and triturated several times in a mortar with water until the wash water is neutral. This product is dried in a drying oven and dissolved in a minimum amount of boiling benzene (about 100 volumes). The solution is filtered while hot and concentrated to half its volume to cause crystallization. Separation and drying produces a good yield of crude α-estradiol. The mother liquor contains a mixture of α-estradiol, 17-tosyl β-estradiol and a small amount of the compound dehydrated at the 16,17-position. Concentration of the mother liquor and renewed extraction with benzene produces a second yield of impure α-estradiol.

The crude α-estradiol, M. P.=215–218° C., changes after one or two recrystallizations in benzene into the pure product, M. P.=225° C., $[α]_D^{20} = +52.9° ±1$ (c.=0.9%, dioxane), which is soluble in alcohol, acetone and aqueous alkalies, soluble in more than 100 volumes of boiling benzene, little soluble in ether and chloroform, and insoluble in water and aqueous diluted acids.

EXAMPLE 4

Preparation of 3,17-ditosyl β-estradiol 10 g. of β-estradiol are dissolved in 50 cc. of anhydrous pyridine, and 20 g. of p-toluene sulfochloride are added. The temperature of the mixture rises to about 40° C. The mixture is left standing at room temperature for 24 hours, and is then poured into 100 cc. of chloroform wherein it dissolves completely. After washing several times with water, then with 2 N hydrochloric acid and finally with water until neutral, the chloroform solution is dried over sodium sulfate, filtered and evaporated to dryness. 100 cc. of isopropyl ether are added to the residue, and the solution is heated under reflux. Estradiol ditosylate crystallizes while hot, whereas any tosyl chloride that may not have been eliminated during the washings remains undissolved. Following filtering while hot, the 3,17-ditosyl β-estradiol is washed with hot isopropyl ether, then with iced methanol. After separating and drying there remain 15.5 g. (or a yield of 72%) of the desired ditosylated derivative, M. P.=155° C. Recrystallization in two volumes of ethyl acetate produces the pure product, M. P.=157° C., $[α]_D^{20} = +19° ±1$ (c.=1%, dioxane), which appears in form of colorless needles, soluble in acetone, methylethyl ketone, benzene, chloroform, tetrahydrofurane, little soluble in methanol, ethanol, ether, ethyl acetate, and insoluble in isopropyl ether, hexane, cyclohexane.

EXAMPLE 5

Acetolysis of 3,17-ditosyl β-estradiol and saponification of the acetoxylated product into α-estradiol 10 g. of fused potassium acetate and 70 cc. of dimethylformamide are added to 10 g. of 3,17-ditosyl β-estradiol, M. P.=157° C., prepared according to Example 4. After adding 5 cc. of water, the solution is heated for six hours in an oil bath to 170–175° C., whereupon the solution is cooled and poured into 250 cc. of water. The gummy precipitate that forms is extracted with 100 cc. of chloroform, wherein it is readily dissolved. The chloroform solution is decanted, washed with water, dried over magnesium sulfate and then evaporated to dryness. The residue, consisting of a light brown oil, is saponified by heating for one hour in a water bath under a stream of nitrogen after 50 cc. of ethanol, 5 g. of potassium dissolved in 5 cc. of water and 20 cc. of methanol have been added. After the solution is vacuum evaporated to dryness, the yellowish, waxy solid residue is stirred into 300 cc. of water, and the resulting milky solution is acidified by adding concentrated hydrochloric acid using Congo red paper as indicator. A light pink precipitate forms which is separated and washed by pasting with hot water. This precipitate is separated, dried, dissolved in 300 cc. of boiling benzene, filtered through charcoal and allowed to crystalline. Separation and drying produces 1.5 g. of practically pure α-estradiol, M. P.=223° C. The crystallization mother liquor yields, upon addition of cyclohexane, a second, smaller amount, which is purified by recrystallization in benzene.

EXAMPLE 6

Acetolysis of 17-tosyl β-estradiol and saponification of the acetoxylated product In order to produce 17-tosyl β-estradiol, the starting product used is 3-acetyl β-estradiol or β-estradidol 3-benzoate described in the literature which is tosylated at the 17-position according to the method described in Example 1 and then subjected to saponification at the 3-position. The 17-tosyl β-estradiol obtained in this manner is purified by repeated recrystallization in benzene until the melting point is 193.5° C.

0.185 g. of pure 17-tosyl β-estradiol, M. P.=193.5° C., are refluxed for six hours with 0.2 g. of fused potassium acetate, 2 cc. of dimethylformamide and 0.2 cc. of water. The reaction mixture is poured into 20 cc. of water, and the aqueous mixture is extracted with chloroform. After washing the chloroform extract with hydrochloric acid and then with water until neutral, it is dried over sodium sulfate, filtered, and evaporated to dryness. The residue consisting of the acetoxylated product is saponified by refluxing for one hour with a solution of 0.1 g. of potassium in 20 cc. of alcohol to which a few drops of water are added. The alcohol is evaporated under vacuum, and the residue is taken up with approximately 20 cc. of water. This alkaline, aqueous solution is filtered in order to eliminate a small amount of resin, and α-estradiol is precipitated by acidification with hydrochloric acid. After filtering, washing with water, drying and recrystallizing in benzene, α-estradiol identical with that described in the preceding examples is obtained.

It will be obvious that changes may be made in the specific reaction conditions, such as the temperature or duration of the reactions, or that other than the exemplified solvents may be employed without exceeding the scope of the herein-claimed invention.

We claim:

1. The method of preparing α-estradiol, which comprises dissolving as starting material a compound taken from the group consisting of β-estradiol and 3-acyl β-estradiols in anhydrous pyridine, adding p-toluene sulfochloride while stirring, heating, dissolving the reaction mixture in chloroform, washing with water and hydrochloric acid to remove pyridine, recovering from the purified chloroform solution an intermediary compound of the general formula

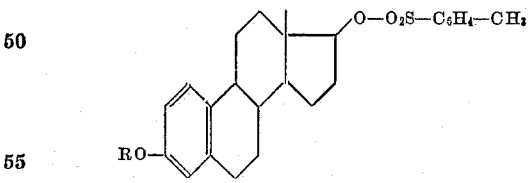

wherein R represents a member of the group consisting of hydrogen, acyl and tosyl, taking said intermediary compound up in dimethylformamide, adding an alkali acetate, heating to cause acetoxylation accompanied by inversion of the hydroxyl at the 17-position, cooling, pouring into water, extracting the resulting precipitate with chloroform, washing, neutralizing, filtering and evaporating the chloroform solution to dryness, dissolving the residue in alcohol, adding potassium hydroxide, heating while introducing a stream of nitrogen, evaporating to dryness, cooling, taking up with water, neutralizing with hydrochloric acid, separating and triturating the resulting precipitate with water, drying, dissolving in boiling benzene, concentrating the benzene solution and recovering the crystalline precipitate.

2. The method according to claim 1, wherein said starting material is 3-benzoyl β-estradiol and said intermediary compound is 3-benzoyl 17-tosyl β-estradiol.

3. The method according to claim 1, wherein said starting material is β-estradiol and said intermediary compound is 3,17-ditosyl β-estradiol.

4. The method according to claim 1, which comprises dissolving 3-acetyl β-estradiol in anhydrous pyridine, adding p-toluene sulfochloride while stirring, heating, dissolving the reaction mixture in chloroform, washing with water and hydrochloric acid to remove pyridine, recovering from the purified chloroform solution 3-acetyl 17-tosyl β-estradiol, dissolving in a member selected from the group consisting of ethanol and methanol and heating with potassium hydroxide to saponify in the 3-position, and recovering and purifying 17-tosyl β-estradiol prior to said acetoxylation accompanied by inversion of the hydroxyl at the 17-position.

5. The method according to claim 4, wherein said 3-acetyl β-estradiol is replaced by 3-benzoyl β-estradiol.

6. The method according to claim 1, wherein said anhydrous pyridine is replaced by methylethyl pyridine.

7. The method according to claim 1, wherein said alkali acetate is fused potassium acetate.

No references cited.